(12) United States Patent
Twiss et al.

(10) Patent No.: US 8,010,748 B2
(45) Date of Patent: Aug. 30, 2011

(54) CACHE STRUCTURE FOR PEER-TO-PEER DISTRIBUTION OF DIGITAL OBJECTS

(75) Inventors: Adam Dominic Twiss, Cambridge (GB); David Sinclair Ferguson, Cambridge (GB); Jim Minter, Ely (GB)

(73) Assignee: Velocix Ltd., Cambridge (GB)

( * ) Notice: Subject to any disclaimer, the term of this patent is extended or adjusted under 35 U.S.C. 154(b) by 571 days.

(21) Appl. No.: 11/598,112

(22) Filed: Nov. 8, 2006

(65) Prior Publication Data

US 2008/0040545 A1 Feb. 14, 2008

(30) Foreign Application Priority Data

Aug. 11, 2006 (GB) .................................. 0615965.1

(51) Int. Cl.
*G06F 13/00* (2006.01)

(52) U.S. Cl. ......................... 711/137; 709/217

(58) Field of Classification Search .................. 711/137; 709/217
See application file for complete search history.

(56) References Cited

U.S. PATENT DOCUMENTS

| | | |
|---|---|---|
| 5,511,208 A | 4/1996 | Boyles |
| 5,892,914 A | 4/1999 | Pitts |
| 6,003,030 A | 12/1999 | Kenner |
| 6,098,096 A | 8/2000 | Tsirigotis et al. |
| 6,108,703 A | 8/2000 | Leighton |
| 6,167,438 A | 12/2000 | Yates |
| 6,415,280 B1 | 7/2002 | Farber |
| 6,745,243 B2 | 6/2004 | Squire |
| 6,823,377 B1 | 11/2004 | Wu et al. |
| 6,928,441 B2 | 8/2005 | Haegele |
| 7,010,578 B1 | 3/2006 | Lewin |
| 7,035,911 B2 | 4/2006 | Lowery et al. |
| 7,043,524 B2 | 5/2006 | Shah et al. |
| 7,043,558 B2 | 5/2006 | Yoshida |
| 7,047,287 B2 | 5/2006 | Sim et al. |
| 2003/0158958 A1 | 8/2003 | Chiu |
| 2003/0204602 A1 | 10/2003 | Hudson ................. 709/228 |
| 2004/0148344 A1 | 7/2004 | Navar et al. |
| 2004/0193714 A1 | 9/2004 | Bowman et al. |
| 2006/0165014 A1 | 7/2006 | Ikeda ................. 370/254 |
| 2006/0224758 A1 | 10/2006 | Chen et al. |

(Continued)

FOREIGN PATENT DOCUMENTS

EP 0 847 020 10/1998

(Continued)

OTHER PUBLICATIONS

BitTorrent Protocol, Aug. 6, 2005, BitTorrent, Inc., [retrieved May 22, 2009] retreived from the internet: <URL:http://web.archive.org/web/20050806000725/www.bittorrent.com/protocol.html>, pp. 1-7.*

(Continued)

*Primary Examiner* — Jared I Rutz
(74) *Attorney, Agent, or Firm* — Ryan, Mason & Lewis, LLP

(57) ABSTRACT

A method for the distribution of digital objects in a peer-to-peer network is disclosed. The digital objects are distributed in a plurality of pieces. At least some of a plurality of peers are connected to other ones of the plurality of peers and at least one of the peers is connected to at least one cache.

27 Claims, 3 Drawing Sheets

U.S. PATENT DOCUMENTS

2007/0174428 A1\* 7/2007 Lev Ran et al. .............. 709/218

FOREIGN PATENT DOCUMENTS

| EP | 0 315 091 | 5/2003 |
|---|---|---|
| EP | 1 413 119 | 5/2006 |
| GB | 2412279 A | 9/2005 |
| WO | WO 99/05584 | 2/1999 |
| WO | WO 02/42900 A2 | 5/2002 |
| WO | WO 02/058360 A3 | 7/2002 |
| WO | WO 02/089000 A1 | 11/2002 |
| WO | WO 03/015377 A1 | 2/2003 |
| WO | WO 03/046736 A1 | 6/2003 |
| WO | WO 03/088065 A1 | 10/2003 |
| WO | WO 2005/084132 A2 | 9/2005 |

OTHER PUBLICATIONS

Chandhok, Nikhil—Web Distribution Systems: Caching and Replication, Nov. 18, 1999, pp. 1-13, http://www.cse.wustl.edu/%7Ejain/cis788-99/ftp/web_caching/index.html.

Konstanty, Piotr—Web Cache Charging Policies, Nicholas Copernicus University, NLANR Web Caching Workshop, Torun, Poland, Coulder, 1997, 3 pages http://workshop97.ircache.net/Papers/Kozinski/kozinski.html.

Malpani, Radhika—Making World Wide Web Caching Servers Cooperate, University of California at Berkeley, 10 pages, 1995 http://bmrc.berkeley.edu/research/publications/1995/138/paper-59.html.

XP-002460863, Peer to Peer Cache Discovery Protocol (CDP) cachelogic-cdp-specification-02.txt, CacheLogic Ltd., Aug. 25, 2006.

Chu, H., "Relay Mode," Dec. 16, 2005, http://rakshasa.no/pipermail/libtorren_t-devel/2005-December/000447.html>, pp. 1-2.

Vlavianos, A. et al., "BiToS: Enhancing BitTorrent for Supporting Streaming Applications," Department of Computer Science and Engineering, University of California Riverside, pp. 1-6, http://castor.sics.se/presentations/papers/bitos.pdf, 2006.

Legout, A. et al., "Understanding BitTorrent: An Experimental Perspective," INRIA-00000156, Version 3, Nov. 9, 2005, I.N.R.I.A., Sophia Antipolis, France, http://bal.inria.fr/inria-00000156/en, pp. 1-16.

Otto, C., "IO bound," Thursday, Apr. 12, 2007, http://lists.ibiblio.org/pipermail/bittorrent/2007-April/002075,html, p. 1.

International Search Report and the Written Opinion for International Application No. PCT/EP2007/007107, mailed on Nov. 26, 2007.

\* cited by examiner

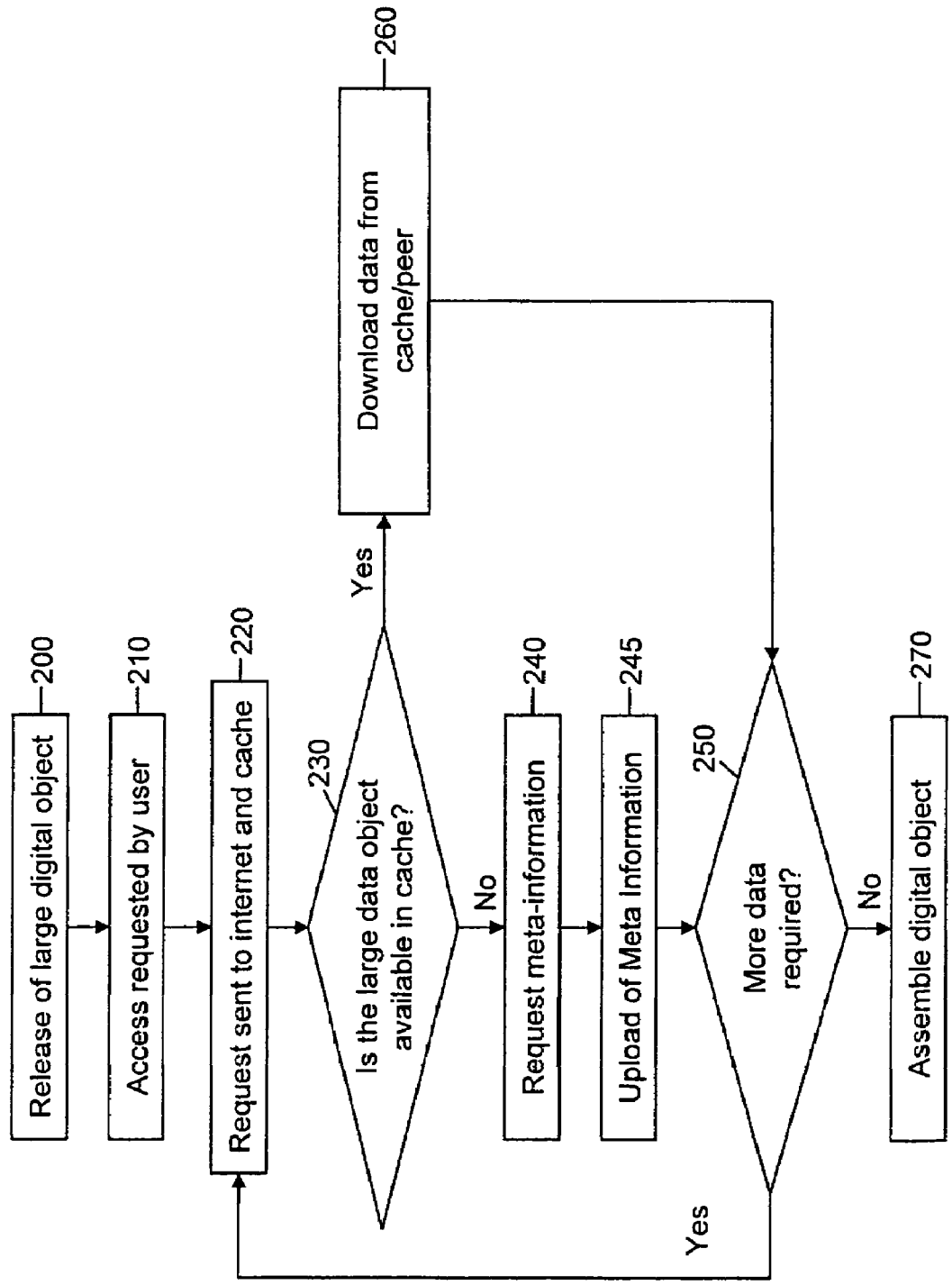

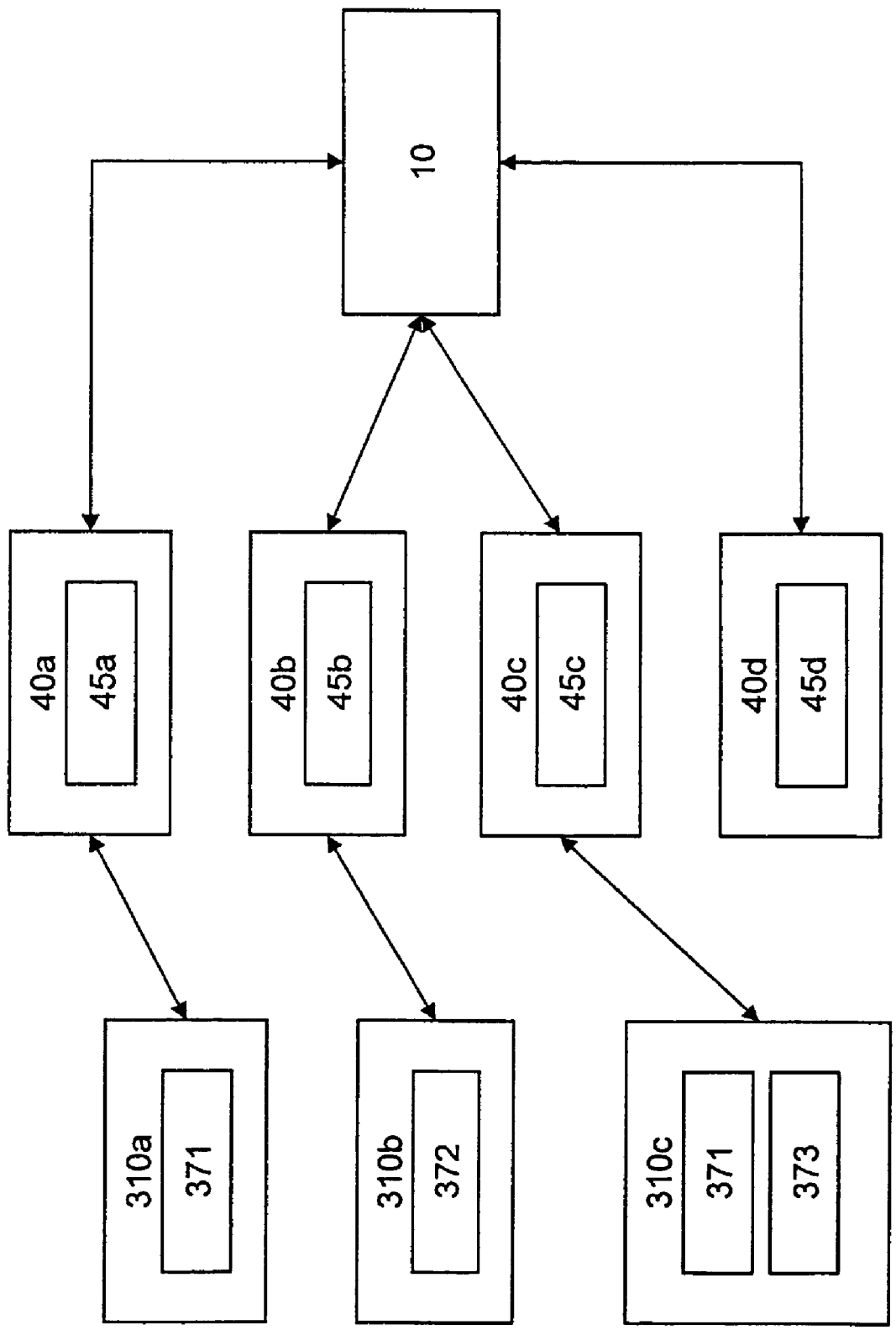

CACHE STRUCTURE FOR PEER-TO-PEER DISTRIBUTION OF DIGITAL OBJECTS

FIELD OF THE INVENTION

The invention relates to caches used in the Internet. In particular, the invention relates to caches in peer-to-peer (P2P) networks for the distribution of large digital objects.

BACKGROUND TO THE INVENTION

A peer-to-peer (also termed P2P) computer network is a network that relies primarily on the computing power and bandwidth of the participants in the computer network rather than concentrating computing power and bandwidth in a relatively low number of servers. P2P computer networks are typically used for connecting nodes of the computer network via largely ad hoc connections. The P2P computer network is useful for many purposes. Sharing content files containing, for example, audio, video and data is very common. Real time data, such as telephony traffic, is also passed using the P2P network.

A pure P2P network does not have the notion of clients or servers, but only equal peer nodes that simultaneously function as both "clients" and "servers" to the other nodes on the network. This model of network arrangement differs from the client-server model in which communication is usually to and from a central server. A typical example for a non P2P file transfer is an FTP server where the client and server programs are quite distinct. In the FTP server clients initiate the download/uploads and the servers react to and satisfy these requests from the clients.

Some networks and channels, such as Napster, OpenNAP, or IRC @find, use a client-server structure for some tasks (e.g., searching) and a P2P structure for other tasks. Networks such as Gnutella or Freenet use the P2P structure for all purposes, and are sometimes referred to as true P2P networks, although Gnutella is greatly facilitated by directory servers that inform peers of the network addresses of other peers.

One of the most popular file distribution programs used in P2P networks is currently BitTorrent which was created by Bram Cohen. BitTorrent is designed to distribute large amounts of data widely without incurring the corresponding consumption in costly server and bandwidth resources. To share a file or group of files through BitTorrent, clients first create a "torrent file". This is a small file which contains meta-information about the files to be shared and about the host computer (the "tracker") that coordinates the file distribution. Torrent files contain an "announce" section, which specifies the URL of a tracker, and an "info" section which contains (suggested) names for the files, their lengths, the piece length used, and a SHA-1 hash code for each piece, which clients should use to verify the integrity of the data they receive.

The tracker is a server that keeps track of which seeds (i.e. a node with the complete file or group of files) and peers (i.e. nodes that do not yet have the complete file or group of files) are in a swarm (the expression for all of the seeds and peers involved in the distribution of a single file or group of files). Nodes report information to the tracker periodically and from time-to-time request and receive information about other nodes to which they can connect. The tracker is not directly involved in the data transfer and is not required to have a copy of the file. Nodes that have finished downloading the file may also choose to act as seeds, i.e. the node provides a complete copy of the file. After the torrent file is created, a link to the torrent file is placed on a website or elsewhere, and it is normally registered with the tracker. BitTorrent trackers maintain lists of the nodes currently participating in each torrent. The computer with the initial copy of the file is referred to as the initial seeder.

Using a web browser, users navigate to a site listing the torrent, download the torrent, and open the torrent in a BitTorrent client stored on their local machines. After opening the torrent, the BitTorrent client connects to the tracker, which provides the BitTorrent client with a list of clients currently downloading the file or files.

Initially, there may be no other peers in the swarm, in which case the client connects directly to the initial seeder and begins to request pieces. The BitTorrent protocol breaks down files into a number of much smaller pieces, typically a quarter of a megabyte (256 KB) in size. Larger file sizes typically have larger pieces. For example, a 4.37 GB file may have a piece size of 4 MB (4096 KB). The pieces are checked as they are received by the BitTorrent client using a hash algorithm to ensure that they are error free.

As further peers enter the swarm, all of the peers begin sharing pieces with one another, instead of downloading directly from the initial seeder. Clients incorporate mechanisms to optimize their download and upload rates. Peers may download pieces in a random order and may prefer to download the pieces that are rarest amongst it peers, to increase the opportunity to exchange data. Exchange of data is only possible if two peers have a different subset of the file. It is known, for example, in the BitTorrent protocol that a peer initially joining the swarm will send to other members of the swarm a BitField message which indicates an initial set of pieces of the digital object which the peer has available for download by other ones of the peers. On receipt of further ones of the pieces, the peer will send a Have message to the other peers to indicate that the further ones of the pieces are available for download.

Caches for the intermediate storage of data transferred about the Internet are known in the art. The most common type of cache used in the Internet is a proxy cache. The proxy cache operates at the application level, passing some messages unaltered between a client and a server, changing other ones of the messages and sometimes responding to the messages itself rather than relaying the messages. A web proxy cache sits between servers in the Internet and one or more clients and watches requests for HTML pages, images and files (collectively known as objects) pass through. The web proxy cache saves a copy of the HTML pages, images and files for itself. Subsequently if there is another request for the same object, the web proxy cache will use the copy that was saved instead of asking an origin server to resend the request.

There are three main reasons why such proxy caches are used:

i) In order to reduce latency—in this case, the request is satisfied from the cache (which is closer to the client) instead of the origin server. It therefore takes less time for the client to get the object and display the object. This makes web sites seem more responsive to the client.

ii) To reduce traffic—Each object is only retrieved once from the server, and thus the cache reduces the amount of bandwidth used by a client. This saves money if the client is paying for the traffic and keeps the client's bandwidth requirements lower and more manageable.

iii) To increase delivery speed.

It would be advantageous if the cache could participate in the peer-to-peer distribution network and become a member of a swarm. By becoming a member, the cache would reduce traffic, increase delivery speed and reduce latency in the peerto-peer distribution network. In order to become a member, the cache must know about the distribution of the file.

SUMMARY OF THE INVENTION

The invention provides a method for distributing digital objects in a network, the digital objects being distributable in a plurality of pieces, wherein at least some of a plurality of peers are connected to other ones of the plurality of peers, at least one cache and the at least one of the plurality of peers is connected to at least one data source on which at least one piece of the digital objects is stored. The method comprises a first step of receiving a message relating to the digital object from a first one of the plurality of peers at the at least one cache followed by a second step of checking whether meta-information relating to the digital object is available in the at least one cache. In this context the meta-information includes, but is not limited to, a list of the peers in the swarm from which pieces of the digital object are available. In a third step the meta-information is requested from a meta-information source in the event that the meta-information is unavailable in the at least one cache. Finally in a fourth step the meta-information is received at the at least one cache and a fifth step of storage of the plurality of pieces in the at least one cache based on the meta-information commences.

This method allows a cache to begin to participate in the downloading of a digital object in a peer-to-peer network and supplying pieces of the digital object to other members of the peer-to-peer network without even initially knowing about the existence of the digital object.

The invention also provides a network for the distribution of digital objects wherein the digital objects are distributable in a plurality of pieces. The network comprises: a plurality of peers in a peer-to-peer network which request the download of at least one piece of a first digital object. At least one data source is present in the network on which at least pieces of the first digital object are stored and at least one of the plurality of peers is connected to the at least one data source. The computer network comprises at least one cache with a plurality of peers being connected to the at least one cache and at least one piece of the requested piece of the first digital object is downloaded from the at least one data source to the peer. Finally at least one meta-information source is provided which comprises meta-information relating to the digital object which can be downloaded to the at least one cache to ensure that the at least one cache knows about the digital object.

The network comprising the at least one cache can thereby comprise only one cache or a plurality of caches that may be connected to other ones of the caches. Several caches may be located in the same place or may be located on different places to provide short distance access to the peers.

The at least one cache may thereby function similar or identical to a peer in the P2P network, whereby the cache can provide higher download speed than other peers functioning as data sources. In addition, peers can quickly collect copies of a whole digital object making use of the plurality of peers downloading different pieces of the digital object in parallel, which is particularly useful with large digital objects.

The at least one cache may also be additionally connected to a network. The cache can also be connected to a data source, on which a whole digital object or pieces of a digital object are stored. The data source may also be a data source or server of a publisher wishing to distribute digital objects. Thus, the cache can act as a mirror server.

The method further may also comprise a step of delaying the requesting of some of the pieces of a digital object. For example, it may be advantageous to only pass the digital object or pieces of the digital object to the cache when a large number of peers wish to download the digital object. The decision if and when to upload digital objects could, for example, be based on the frequency of request for the download of the digital object.

DESCRIPTION OF THE FIGURES

FIG. 2 shows a flow diagram for the downloading of data.
FIG. 3 shows a further examples of the structure of the cache.

DETAILED DESCRIPTION OF THE INVENTION

Figure 1:
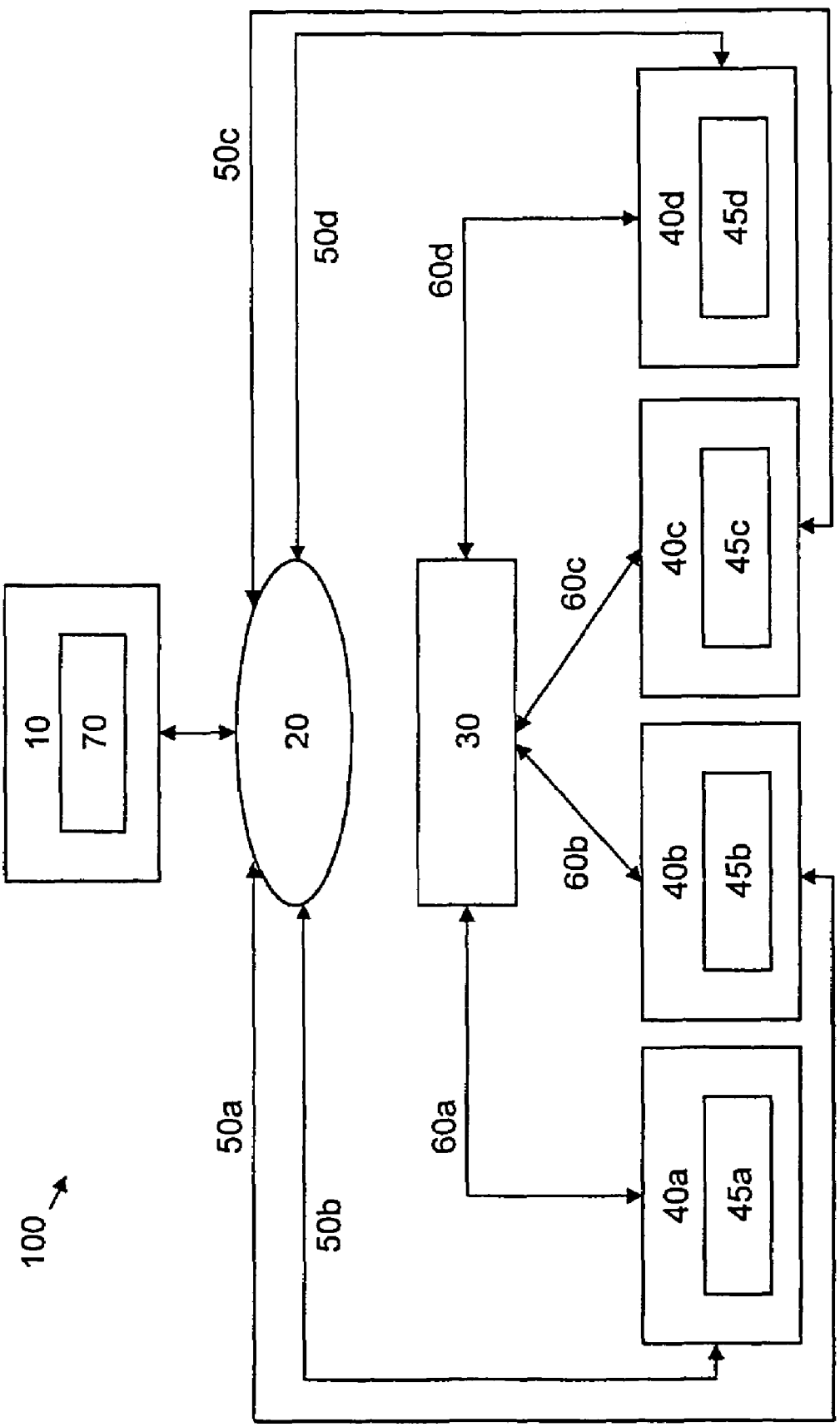
FIG. 1 shows the structure of the cache.

FIG. 1 shows the structure of the cache in accordance with the invention. The network 100 shown in FIG. 1 comprises a Peer-to-Peer (P2P) server 10 connected to Internet 20. Four users 40a, 40b, 40c and 40d are illustrated. Each of the four users 40a-d is also connected to the Internet over connections 50a-d. Each of the four users 40a-d is also connected to a cache 30 over connections 60a-d. Each of the four users 40a-d has a local memory 45a-d which can store data for local access and will also have a P2P client stored on their machines. Thus, each user 40a-d is also referred to as peer 40a-d interchangeably. However, it must be understood that the invention is applicable to a plurality of peers 40a-d connected to multiple caches 30 and multiple P2P servers 10. Typically, one or more of the caches 30 would be connected to an access point of an Internet Service Provider.

The peers 40a-d may also be connected to each other.

The connections 50a-d between the peers 40a-d and the Internet 20 are standard connections which may be implemented using any one of the standard protocols and hardware. Similarly, the connections 60a-d between the peers 40a-d and the cache 30 are standard connections which can be implemented using any one of the standard protocols and hardware.

Suppose that each of the peers 40a-d wish to substantially, simultaneously access a digital object 70 stored on the P2P server 10. The digital object 70 could, for example, be a new film or a television programme released for downloading. Once a release date and time for the new film or the downloadable television programme is announced, it is highly likely that a plurality of the peers 40a-d will wish to access the new film or downloadable television programme at substantially the same time. Since the new film or downloadable television programme has recently been released, it will not be present in the cache 30, and the cache 30 will not know of the existence of the digital object. Thus, the peers 40a-d will only be able to access the new film or the downloadable television programme from the P2P server 10 through the Internet 20.

The access of the digital object 70 may be described using the method shown in the flow chart of FIG. 2. At step 200, the digital object 70 is released which a number of the peers 40a-d will be interested in accessing at step 210. Multiple requests for access (i.e. one from each of the peers 40a-d) are sent in step 220 both to the P2P server 10 (via the connections 50a-d and the Internet 20) and to the cache 30 (via the connections 60a-d) and to other ones of the peers 40a-d. The cache 30 may not contain any pieces of the digital object 70 because the large digital object 70 has recently been released (as is tested at step 230) and furthermore, as explained above, the cache (30) will not know initially of the existence of the digital object.

The multiple requests to access the P2P server 10 are passed to the P2P server 10 and for each of the multiple requests pieces of the digital object 70 are passed to each of the requesting peers 40a-d. The pieces sent to the peers 40a-d will be selected substantially at random and thus it is likely that whilst some of the peers 40a-d may receive the same pieces, many of the other peers 40a-d will receive different pieces.

At the same time, the cache 30 will request meta-information relating to the digital object in step 240. The meta-information includes, but is not limited to, an identity—such as a hash sum—for the digital object and lists of peers storing at least parts of the digital object (i.e. members of the swarm).

The peers 40a-d receive the pieces and store the pieces locally in the local memory 45a-d. At least one of the peers 40a-d will upload the meta-information to the cache 30 in step 245 relating to the digital object in one example of the invention. It is possible that more than one of the peers 40a-d will upload the meta-information. Now having the meta-information the cache 30 can itself act as a peer and may, for example, upload the pieces of the digital object into the cache 30 from the peers 40a-d. At step 250, a check is then made to check whether all of the pieces required for the large digital object 70 are stored in the local memory 45a-d or whether more pieces are required. In the event that more pieces are required a further request is sent for pieces of the digital object 70 at step 220.

In the meantime, the cache 30 will now have pieces stored in the cache 30 which were not previously present. As explained above, the cache 30 also acts as a peer in the network 100 and will issue a message to the other peers in the network 100 to inform the other peers that it now has pieces. This is done, in the BitTorrent protocol, by sending a BitField message and/or a Have message. Similar messages are available in other protocols. When the peers 40a-40d in the network 100 receive the message the peers 40a-40d commence sending requests for the pieces to the cache 30. The cache 30 will respond to these requests as shown in step 260 by sending the pieces to the peers 40a-40d. The cache 30 generally responds to every request received; unlike the peers 40a-40d the cache 30 will not choke the requests for pieces. In step 260, pieces could of course be supplied from other peers 40a-d.

All of the peers 40a-d are connected to both the P2P server 10 and to the cache 30. Therefore, the peers 40a-d are continuously sending requests to the P2P server 10, to other ones of the peers 40a-40d and to cache 30. The peers 40a-40d thereby receive pieces from the P2P server 10, other ones of the peers 40a-40d and the cache 30. Over time, all of the pieces for the digital object 70 from the P2P server 10 will be downloaded by at least one of the peers 40a-d and uploaded to the cache 30 from where the data (bytes) are shared with the other peers 40a-d.

At step 270, all of the bytes required to re-create the large digital object 70 are in the local memories 45a-d and the digital object 70 is assembled in the local memories 45a-d.

Since the time taken to download all of the data from the P2P server 10 over the Internet 20 and the connections 50a-d is substantially longer than the time taken to download the data from the cache 30 along the connections 60a-d, there is a substantial time saving in the downloading of the data. In addition, download traffic on the Internet 20 can be considerably reduced as each of the pieces of the digital object 70 has to be downloaded only once from the P2P server 10 by one of the peers 40a-40d to finally provide a copy of the whole digital object 70 to the cache 30 and hence to all of the peers 40a to 40d.

The cache 30 can also download the meta-information relating to the digital object and the pieces of the digital object from the P2P server 10 without the meta-information and/or the pieces passing through the peers 40a-d.

A publisher may provide a copy of the digital object including the meta-information to the cache 30, enabling direct download for the peer 40a to 40c.

The cache 30 can delay the requesting of some of the pieces of the data objects. Thus the cache 30 can supply pieces of the data object which are not available in the peers 40a-d. When the number of pieces present in the cache 30 but not present in the peers 40a-d falls below a certain level, then the cache 30 can request pieces of the digital object. This level depends on the digital object being downloaded or it could be a fixed number.

Some of the peers 40a-d may each be connected to different data sources 310a-c. Each of the different data sources 310a-c provides different pieces 371, 372 and 373 of the digital object 370. For example, the peer 40a may, except being connected to the cache 30, be connected to the data source 310a, for example, via the internet. The data source 310a has only a first piece 371 of the digital object 370 available for download. The peer 40a may be looking for the first piece 371, the peer 40a may also be looking for a second piece 372 and a third piece 373, which are not available on the data source 310a the peer is connected to. However, as peer 40a is requesting the first piece 371 of the digital object 370, the peer 40a will download piece 371 to the local memory 45a and subsequently upload it to the cache 30 (shown on FIG. 1), wherefrom, it is available for download to all the peers 40a-d.

In parallel, the peer 40b may also wish to download digital object 370. As the first piece 371 of the digital object 370 is available in the cache 30, peer 40b may download the first piece 371 of the digital object 370 from the cache 30 to the local memory 45b. The peer 40b may, except being connected to cache 30, also be connected to a second data source 310b which has the second piece 372 of the digital object 370 available for download. Thus, peer 40b will download the second piece 372 of the digital object 370 from the data source 310b, store the second piece 372 in the local memory 45b, and upload a copy of the second piece 372 to the cache 30. Thus, both the peer 40b and the cache 30 each have the first piece 371 and the second piece 372 of the digital object 370.

Peer 40a may now check on a regular basis the availability of the pieces of the digital object on the cache 30. The check for the availability is done by examining BitField or Have messages issued by the cache 30. The peer 40a will identify from the BitField or Have messages that the first piece 371 and the second piece 372 of the digital object 370 are available for download in the cache 30. As the peer 40a has already downloaded the first piece 371, the peer 40a will now download the second piece 372.

The third peer 40c may now wish to download the digital object 370. The third peer 40c is connected to the cache 30 and to a third data source 310c. The third peer 40c now finds the first piece 371 and the second piece 372 of the digital object 370 available on the cache 30. The third peer 40c may also find the first piece 371 and the third piece 373 available on the data source 310c. The third peer 40c may download the first piece 371 either from the cache 30 or from the data source 310c depending on the download speed and fast access availability.

It is probable that access from the cache 30 is faster. Downloading from the cache 30 may be preferred as the cache 30 is always ready for download and—as explained above—generally unchokes every request for one of the pieces. However, should the cache 30 be unavailable or slow, for example, caused by large data transfers, the third peer 40c may download the first piece 371 from the third data source 310c. The third peer 40c will download the second piece 372 from the cache 30 and the third piece 373 of the digital object 370. Subsequently, the third peer 40c will upload the third piece 373 of the digital object 370 to the cache 30.

The cache 30 now has the first piece 371, the second piece 372 and the third piece 373 of the digital object 370 available for download. The first peer 40a and the second peer 40b may download the missing third piece 373 of the digital object 370 from the cache 30.

A fourth peer 40d requesting to download digital object 370 may download all the three pieces 371, 372, and 373 of the digital object 370 from the cache 30 without accessing or connecting to any of the data sources 310a-310c. As pieces 371, 372, and 373 of the digital object 370 can be downloaded from the cache 30, the need for slow upload connections with other peer 40a-40c is eliminated.

It is to be understood that the example described with respect to FIG. 3 is an illustrative example and that digital object 370 may have a plurality of pieces 371, 372, 373. The plurality of pieces 371, 372 and 373 of the digital object 370 may be downloaded by many more peers 40a-40c. The peers 40a-40c may also download pieces of the digital object 370 from the data sources 310a-c and upload pieces to the cache 30 in parallel. It is also obvious that the peer 40a-40c may download a large number of pieces or even all of the pieces of the digital object 370 from a single data source.

The method and the network 100 are based on a P2P network, thus, allowing any combination of downloads and uploads within the network 100.

Although this invention has been described with respect to the BitTorrent protocol, it is not intended to be limiting of the application to such a protocol. The invention is equally applicable to other protocols.

The foregoing description is that of the preferred embodiments of the invention and that various changes and modifications may be made thereto without departing from the spirit and scope of the invention.

The invention claimed is:

1. A method for distributing digital objects in a network, the digital objects being distributable in a plurality of pieces, wherein at least some of a plurality of peers are connected to other ones of the plurality of peers and at least one of the peers being connected to at least one cache, the method comprising:
receiving a message relating to a digital object from a first one of the plurality of peers at the at least one cache;
checking whether meta-information relating to the digital object is available in the at least one cache;
requesting the meta-information from a meta-information source in the event that the meta-information is unavailable in the at least one cache;
receiving the meta-information at the at least one cache; and
storing one or more of the plurality of pieces in the at least one cache based on the meta-information;
the method further comprising the at least one cache deciding to delay requesting some of the pieces of some of the data objects.

2. The method of claim 1, wherein storing of the one or more of the plurality of pieces comprises obtaining one or more pieces of the digital object from at least some of the plurality of peers.

3. The method of claim 1, wherein the storing of the one or more of the plurality of pieces comprises obtaining one or more pieces of the digital object from the first one of the plurality of peers.

4. The method of claim 1, wherein the storing of the one or more of the plurality of pieces comprises obtaining one or more pieces of the digital object from at least a further cache.

5. The method of claim 1, further comprising connecting to a tracker subsequent to receiving the meta-information to identify members of a swarm and subsequently connecting to and requesting data from at least one of the members of the swarm.

6. The method of claim 1, further comprising connecting to a tracker subsequent to receiving the meta-information to identify members of a swarm and subsequently connecting to and transmitting data to the at least one of the members of the swarm.

7. The method of claim 1, wherein the meta-information is selected from the group consisting of check sums, file names, file lengths, number of pieces, tracker addresses, seed addresses, server addresses, publisher information, digital signatures and piece sizes.

8. The method of claim 1, further comprising checking whether the cache is forbidden from requesting, storing or serving the digital object.

9. The method of claim 1, wherein the meta-information source is selected from the group consisting of one of the plurality of peers, a further cache, or a network probe.

10. A method for distributing digital objects in a network, the digital objects being distributable in a plurality of pieces, wherein at least some of a plurality of peers are connected to other ones of the plurality of peers and at least one of the peers being connected to at least one cache, the method comprising:
receiving a message relating to a digital object from a first one of the plurality of peers at the at least one cache;
checking whether meta-information relating to the digital object is available in the at least one cache;
requesting the meta-information from a meta-information source in the event that the meta-information is unavailable in the at least one cache;
receiving the meta-information at the at least one cache;
storing one or more of the plurality of pieces in the at least one cache based on the meta-information; and
delaying requesting some of the pieces of some of the data objects, wherein the requesting of some of the pieces is delayed until the at least one cache determines that the number of pieces present in the at least one cache but not present in the plurality of peers falls below a particular level.

11. The method of claim 10, wherein the particular level is individually configured per digital object.

12. The method of claim 10, wherein the particular level is a fixed number of pieces.

13. The method of claim 10, wherein the particular level is related to the rate at which the plurality of peers are acquiring pieces of the digital object.

14. A network for the distribution of digital objects, the digital objects being distributable in a plurality of pieces, the network comprising:
a plurality of peers, at least some of the plurality of peers being connected to other ones of the plurality of peers;
at least one data source on which at least pieces of the first digital object are stored, at least one of the plurality of peers being connected to the at least one data source;
at least one cache for storing at least one piece of the digital object, whereby at least one of the plurality of peers is connected to the at least one cache; and
at least one meta-information source comprising meta-information relating to the digital object, wherein the meta-information is requested by the at least one cache in the event that the meta-information is unavailable in the at least one cache;

wherein the at least one piece of the digital object is stored in the at least one cache based on the meta-information; and wherein the at least one cache is further configured to decide to delay requesting some of the pieces of some of the data objects.

15. The network of claim 14, wherein the at least one piece of the first digital object uploadable to the at least one cache is downloadable from the at least one cache.

16. The network of claim 14, wherein the at least one cache is additionally connected to the network.

17. The network of claim 14, wherein the network is a private network containing the pieces of digital objects.

18. The network of claim 14, wherein the at least one cache is directly connected to the at least one data source.

19. The network of claim 18, wherein the at least one cache is directly connected to the at least one meta-information source.

20. Apparatus for use in distributing digital objects in a network, the digital objects being distributable in a plurality of pieces, wherein at least some of a plurality of peers are connected to other ones of the plurality of peers, the apparatus comprising:
at least one cache connected to at least one of the peers, and the at least one cache configured to:
receive a message relating to a digital object from a first one of the plurality of peers;
check whether meta-information relating to the digital object is available;
request the meta-information from a meta-information source in the event that the meta-information is unavailable;
receive the meta-information; and
store one or more of the plurality of pieces based on the meta-information;
wherein the at least one cache is further configured to decide to delay requesting some of the pieces of some of the data objects.

21. The apparatus of claim 20, wherein storing one or more of the plurality of pieces comprises obtaining one or more pieces of the digital object from at least some of the plurality of peers.

22. The apparatus of claim 20, wherein the storing one or more of the plurality of pieces comprises obtaining one or more pieces of the digital object from the first one of the plurality of peers.

23. The apparatus of claim 20, wherein the storing one or more of the plurality of pieces comprises obtaining one or more pieces of the digital object from at least a further cache.

24. A method for distributing digital objects in a network, the digital objects being distributable in a plurality of pieces, wherein at least some of a plurality of peers are connected to other ones of the plurality of peers and at least one of the peers being connected to at least one cache, the method comprising:
receiving a message relating to a digital object from a first one of the plurality of peers at the at least one cache;
checking whether meta-information relating to the digital object is available in the at least one cache;
requesting the meta-information from a meta-information source in the event that the meta-information is unavailable in the at least one cache;
receiving the meta-information at the at least one cache; and
storing one or more of the plurality of pieces in the at least one cache based on the meta-information;
wherein the at least one of the peers receives at least a first one of the plurality of pieces from the at least one cache and at least a second one of the plurality of pieces from at least one data source other than the at least one cache.

25. The method of claim 24, wherein the at least one data source comprises at least another of the plurality of peers.

26. Apparatus for use in distributing digital objects in a network, the digital objects being distributable in a plurality of pieces, wherein at least some of a plurality of peers are connected to other ones of the plurality of peers, the apparatus comprising:
at least one cache connected to at least one of the peers, and the at least one cache configured to:
receive a message relating to a digital object from a first one of the plurality of peers;
check whether meta-information relating to the digital object is available;
request the meta-information from a meta-information source in the event that the meta-information is unavailable;
receive the meta-information; and
store one or more of the plurality of pieces based on the meta-information;
wherein the at least one of the peers receives at least a first one of the plurality of pieces from the at least one cache and at least a second one of the plurality of pieces from at least one data source other than the at least one cache.

27. The apparatus of claim 26, wherein the at least one data source comprises at least another of the plurality of peers.

* * * * *